United States Patent
Laermer et al.

(10) Patent No.: US 9,664,304 B2
(45) Date of Patent: May 30, 2017

(54) NORMALLY CLOSED VALVE FOR MICROFLUIDIC COMPONENTS OF A POLYMERIC LAYER SYSTEM AND METHOD

(71) Applicant: Robert Bosch GmbH, Stuttgart (DE)

(72) Inventors: Franz Laermer, Weil der Stadt (DE); Jochen Rupp, Stuttgart (DE); Daniel Czurratis, Stuttgart (DE); Tim Gumbel, Speyer (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 14/219,086

(22) Filed: Mar. 19, 2014

(65) Prior Publication Data
US 2014/0291558 A1    Oct. 2, 2014

(30) Foreign Application Priority Data

Mar. 27, 2013    (DE) .................. 10 2013 205 412

(51) Int. Cl.
*F16K 99/00*      (2006.01)
*B01L 3/00*       (2006.01)

(52) U.S. Cl.
CPC .... *F16K 99/0036* (2013.01); *B01L 3/502707* (2013.01); *B01L 3/502738* (2013.01);
(Continued)

(58) Field of Classification Search
CPC ............... F16K 99/0036; F16K 99/003; F16K 2099/0084; F16K 99/0015; B01L 3/51738;
(Continued)

(56) References Cited

U.S. PATENT DOCUMENTS

| | | | |
|---|---|---|---|
| 5,058,856 A * | 10/1991 | Gordon ..................... | F15C 5/00 251/11 |
| 7,478,792 B2 * | 1/2009 | Oh ............................ | F15C 5/00 137/251.1 |

(Continued)

FOREIGN PATENT DOCUMENTS

| DE | 10 2011 005 811 A1 | 9/2012 |
|---|---|---|
| WO | 2008/016271 A1 | 2/2008 |
| WO | 2008/083446 A1 | 7/2008 |

*Primary Examiner* — Mary McManmon
*Assistant Examiner* — Daphne M Barry
(74) *Attorney, Agent, or Firm* — Maginot, Moore & Beck LLP

(57) ABSTRACT

A normally closed valve for microfluidic components includes a polymer substrate and a polymer membrane film arranged on the polymer substrate. The polymer substrate has a first chamber, a second chamber, and a fluidic barrier element configured to separate the first chamber from the second chamber. The first chamber is fluidically coupled to the second chamber by the polymer membrane film, and, in an initial configuration, a connection of the polymer membrane film to the fluidic barrier element prevents a fluidic communication of the first chamber to the second chamber. The first chamber is at least partially filled with a substance in the initial configuration, and a transfer of the substance from the first chamber into the second chamber takes place by applying a pressure to the substance. The pressure is chosen to be great enough to disconnect the connection of the polymer membrane film to the fluidic barrier element.

15 Claims, 5 Drawing Sheets

(52) U.S. Cl.
CPC ........ *F16K 99/003* (2013.01); *F16K 99/0015* (2013.01); *B01L 2400/0638* (2013.01); *B01L 2400/0683* (2013.01); *F16K 2099/0084* (2013.01)

(58) Field of Classification Search
CPC ....... B01L 3/502707; B01L 2400/0683; B01L 2400/0638
USPC ...................................... 251/11, 57, 61, 61.1
See application file for complete search history.

(56) References Cited

U.S. PATENT DOCUMENTS

| | | | | |
|---|---|---|---|---|
| 7,980,272 | B2 * | 7/2011 | Park | F16K 99/0001 137/828 |
| 8,281,815 | B2 * | 10/2012 | Park | B01L 3/502738 137/828 |
| 2010/0186839 | A1 * | 7/2010 | Namkoong | B01L 3/502738 137/825 |
| 2012/0214254 | A1 * | 8/2012 | Schmidt | B01L 3/50273 436/174 |
| 2013/0255812 | A1 * | 10/2013 | Otto | F04B 19/006 137/827 |

* cited by examiner

NORMALLY CLOSED VALVE FOR MICROFLUIDIC COMPONENTS OF A POLYMERIC LAYER SYSTEM AND METHOD

This application claims priority under 35 U.S.C. §119 to patent application number DE 10 2013 205 412.2, filed on Mar. 27, 2013 in Germany, the disclosure of which is incorporated herein by reference in its entirety.

BACKGROUND

Systems in which the entire functionality of a macroscopic laboratory is accommodated on a plastic substrate, for example the size of a credit card, are referred to as a lab-on-a-chip (LOC). LOC systems are often used for microfluidic applications in which complex biological, chemical and/or physical processes can take place in a miniaturized form. Channels and cavities are necessary for this, in order on one hand to store the liquids in reservoirs and on the other hand to meter them with the aid of valves or control the timing of their release within the LOC system.

In many cases, LOC systems consist of a polymeric layer structure. In the simplest case, this structure consists of two polymer substrates, which comprise cavities in the form of chambers and channels. Between the polymer substrates there is a flexible polymer membrane film, which is provided as a membrane for the valve. In order to ensure the functionality of the LOC system, the necessary liquids must be either stored directly in the LOC chip ('on-chip') or be supplied from the outside by way of fluidic interfaces.

It is of advantage for many LOC applications to store the liquids that are necessary for the functioning of the chip 'on-chip'. Fluid-tight reservoirs and valves are necessary for this, in order to prevent any loss of the liquids by diffusion from occurring even over lengthy storage times. The valve technology is in this case based on the pneumatic deflection of the polymer membrane film, in order to open or close valves. A disadvantage of this is that liquids that are prestored on the chip cannot be stored in a fluid-tight manner without a pneumatic connection, since the valves are not closed in the basic state.

Furthermore, it is known from the prior art to enclose liquid reagents in a microfluidic system during the production process. In this case, for example, predetermined breaking points, which open when a predetermined pressure is reached and thereby allow the reagents to be released into the LOC, may be formed in the polymer-membrane composite.

SUMMARY

The normally closed valve that is defined in the description below has the advantage over conventional solutions that in the first chamber a permanent liquid storage of reagents is now possible directly on the chip of the LOC, since the valve is closed in the initial configuration or in a basic state. The formation of a normally closed valve between the two chambers, in combination with the separation of the two chambers, that is to say with the aid of the fluidic barrier element and the connection of the polymer membrane film and the fluidic barrier element for it, means that a fluid-tight storage of a reagent in the first chamber is possible. The connection of the polymer membrane film to the fluidic barrier element is preferably realized as a material-bonded connection or by means of adhesion. In addition to this, in combination with a wax layer on the polymer membrane film, which is applied on that side that is opposite from the fluidic barrier element, contamination of the reagent is also prevented by the realized fluid-tight storage with long-term stability over the duration of the storage of the LOC until its use. Furthermore, after the first opening of the normally closed valve in the initial configuration, the valve can be closed again by renewed actuation.

In an advantageous way, a disconnection of the polymer membrane film from the valve seat to release the substance from the first chamber into the second chamber only takes place under the action of a predetermined pressure, which is fixed in coordination with the chosen connection between the polymer membrane film and the valve seat.

In addition to this, with the present normally closed valve it is possible to dispense with the use of packagings of the reagents in additional receptacles (such as for example in blister packs, stick packs, metal containers), whereby the production of the LOC is simplified and its costs are reduced.

To realize the normally closed valve according to the disclosure, the use of a polymeric layer structure in combination with a polymer membrane film or a polymer film for the normally closed valve offers significant advantages with regard to its low-cost production. The polymer membrane film may for example be formed from an elastomer, a thermoplastic elastomer, thermoplastics, a heat-sealing film or TPE composite films with high barrier properties. The thickness of a polymer membrane film of a normally closed valve may be between 5 μm and 300 μm. The polymer substrate may be formed from thermoplastics, such as for example PC, PP, PE, PMMA, COP or COC. The thickness of the respective polymer substrates may be between 0.5 mm and 5 mm.

According to a further configuration of the normally closed valve according to the disclosure, the connection of the polymer membrane film to the fluidic barrier element is a material-bonded connection. Soldering, welding and adhesive bonding may be mentioned as examples of producing a material-bonded connection.

According to a further configuration of the normally closed valve according to the disclosure, the material-bonded connection of the polymer membrane film to the fluidic barrier element is realized with the aid of a welded connection of the polymer membrane film to the fluidic barrier element with a predetermined intended breaking resistance. The welded connection advantageously makes it possible on the one hand to use for the closing of the valve a welding process, for example a laser-based welding process, to produce the welded connection, in that the flexible polymer membrane film is connected to the fluidic barrier element, which at the same time realizes the valve seat, between the two chambers of the valve by laser transmission welding. Consequently, the valve in its initial configuration is closed and the necessary fluidic substance can be stored in a fluid-tight manner in a chamber that serves as a reservoir.

However, the bonding strength between the valve seat and the polymer membrane film may only be of such a level that it is still possible to open the valve by applying a predetermined pressure (for example 10-1000 kPa) or a sufficiently high temperature (for example 40-200° C.) or a combination of the two. This is achieved by an appropriate choice of the welding parameters in the laser-based production process. The aim of the welding process is therefore on the one hand to realize a fluidically tight sealing of the interface between the polymer membrane film and the fluidic bather element. On the other hand, the bonding strength of the welded connection is intended to be as low as possible, in order to keep the force required for opening the welded connection as low as possible. It is in this case also possible to speak of an 'unstable weld seam'. Furthermore, this form of the material-bonded connection has the advantage that no additional production and process steps are necessary for the forming of the welded connection between the polymer membrane film and the fluidic barrier element.

At this point, a possible set of parameters for producing a conventional, that is to say stable, weld seam for a laser-based production process, here in particular by means of contour welding, should be given by way of example. Thus, a circular cavity with a depth of 400 µm and a diameter of 7.6 mm is produced by means of contour welding as a test geometry. The laser has a power output of 700 mW with a laser spot diameter of 400 µm, and is moved with an advancement of 20 mm/s. The testing of the weld seam is then performed on the one hand at room temperature and on the other hand at a temperature of 95° C. With these parameters, a disconnection of the weld seam at room temperature was found to occur under a pressure of over 3 bar, while at 95° C. it was opened under a pressure of 2.2 bar. A possible set of parameters for producing an unstable weld seam for a laser-based production process, here once again by means of contour welding, should now be given for this test geometry. The laser has a power output of 300 mW with a laser spot diameter of 350 µm, and is moved with an advancement of 10 mm/s. This time, a disconnection of the weld seam was found to occur at room temperature under a pressure of 2 bar, while at 95° C. the weld seam was opened under a pressure of only 0.4 bar.

According to a further configuration of the normally closed valve according to the disclosure, the material-bonded connection of the polymer membrane film to the fluidic barrier element is realized with the aid of a wax layer between the polymer membrane film and the fluidic bather element. This material-bonded connection represents an alternative to the aforementioned 'unstable weld seam', in which the material-bonded connection between the polymer membrane film and the fluidic barrier element is realized by what is known as a 'wax bond'. Paraffin may be used for example for this, as a joining means between the fluidic barrier element and the polymer membrane film. The paraffin is applied to the fluidic barrier element in the production process (for example by tampon printing, dispensing or the like), which after appropriate heating and cooling leads to a closing of the valve. In any case, a contact between the fluidic barrier element and the polymer membrane film must be ensured. The melting temperatures of paraffin are variable and can be adapted according to requirements by an appropriate choice of the paraffin (hard or soft paraffin), which facilitates the reproducible opening of the present normally closed valve at a predetermined (opening) temperature. Moreover, if paraffins with different melting points are used, different valves on an LOC can open at different temperatures, whereby individually actuable valves can be realized in the same heating zone. Furthermore, numerous combinations of materials of the valve systems with at the same time good barrier properties are possible by paraffin sealing.

The material-bonded connection in the manner of a 'wax bond' has the advantage that the barrier effect between the fluidic barrier element and the polymer membrane film is greater in comparison with the 'unstable weld seam' on account of the paraffin sealing.

According to a further configuration of the normally closed valve according to the disclosure, in the initial configuration the polymer membrane film is coated on the side lying opposite from the fluidic barrier element with a second wax layer of a predetermined thickness in the region of the fluidic barrier element. Since the polymer membrane film usually comprises for example a thermoplastic elastomer film which is permeable to fluidic substances that are typically used (such as for example alcohols, solvents, aqueous solutions, salt solutions, buffer solutions, etc.), it is desirable for the intended lengthy storage times (weeks, months, years) to increase its barrier properties. This is achieved by a composite of the polymer membrane film with a barrier layer (such as for example a paraffin layer), whereby the polymer membrane film is impermeable to the substance in the first chamber. For this purpose, during the production process the paraffin is applied to the polymer membrane film on the side facing away from the first chamber and heated, so that the molten paraffin is initially distributed uniformly on the polymer membrane film, and after cooling down forms a layer on the polymer membrane film. Furthermore, paraffin is advantageously biocompatible and harmless for most biomedical or diagnostic applications.

According to a further configuration of the normally closed valve according to the disclosure, the fluidic barrier element is formed as a web and forms the valve seat of the normally closed valve. According to this type of construction, a minimal line length is obtained for the connection between the two chambers of the valve, to be specific the width of the web, whereby a small dead volume is advantageously obtained for this connecting channel.

According to a further configuration of the normally closed valve according to the disclosure, the transfer of the substance from the first chamber into the second chamber additionally takes place by the heating of the interface between the polymer membrane film and the fluidic barrier element, the heat that is introduced being chosen such that the material-bonded connection of the polymer membrane film to the fluidic barrier element is disconnected. This involves heating the interface between the polymer membrane film and the fluidic barrier element to a predetermined temperature, at which the material-bonded connection of the polymer membrane film to the fluidic barrier element, for example preferably realized as a layer of wax, is disconnected. For opening such a 'thermally unstable bond', a temperature threshold value (close to or higher than the softening or melting point of the material for the material-bonded connection between the polymer membrane film and the fluidic barrier element, typically 20-100° C.) must be exceeded when there is a corresponding pressure difference (for example 10-1000 kPa) between the cavities (here the first chamber and the recess), under which the paraffin partially or completely liquefies and the valve consequently opens. The use of paraffin with a defined melting point is advantageous here for reproducible opening of the valve.

In an alternative embodiment, for the normally closed valve, both an 'unstable weld seam' and a 'wax bond' may be realized for the material-bonded connection between the polymer membrane film and the fluidic barrier element, the disconnection of the polymer membrane film from the fluidic barrier element with the release of the substance from the first chamber taking place by a combination of the pressure buildup described above and the heating of the wax layer.

According to a further configuration of the normally closed valve according to the disclosure, the first wax layer and/or the second wax layer is formed from paraffin. This involves making use of the fact that paraffin is biocompatible, and consequently harmless for most biomedical or diagnostic applications. In this way, if paraffin is used, a wide range of applications for the normally closed valve according to the disclosure is possible, while at the same time a long-term storage of liquid substances in the LOC is advantageously made possible.

Also disclosed herein is a method for operating a normally closed valve, which has a polymer substrate and also a polymer membrane film, which is arranged on the polymer substrate, the polymer substrate having a first chamber, a second chamber and a fluidic barrier element, and the fluidic barrier element separating the first chamber from the second chamber, the first chamber being fluidically coupled to the second chamber by way of the polymer membrane film, and the first chamber being at least partially filled with a substance in the initial configuration, having the steps of preventing in an initial configuration a fluidic communication of the first chamber with the second chamber with the aid of a connection of the polymer membrane film to the fluidic barrier element and transferring the substance from the first chamber into the second chamber by applying to the substance a pressure that is chosen to be great enough that the connection of the polymer membrane film to the fluidic barrier element is disconnected.

The disclosed method has the advantage that, with the present valve, the polymer membrane film reliably separates the two chambers from one another on account of the (material-bonded) connecting of the polymer membrane film to the fluidic barrier element in the closed state. On account of this simplification of the functioning of the normally closed valve according to the disclosure, lower costs and increased reliability are obtained for the LOC.

The required structures in the polymer substrates or the polymer membrane film may be produced for example by milling, injection molding, hot stamping, punching or laser structuring.

BRIEF DESCRIPTION OF THE DRAWINGS

The present disclosure is explained on the basis of the accompanying drawings, in which.

DETAILED DESCRIPTION

An (inflow) channel should be understood as meaning a structure that realizes a tube-like connection, and may be formed for example as a (microfluidic) flow channel in a layer structure or as a separate line, for example in the manner of a hose or a small tube.

FIGS. 1 to 6 respectively show a sectional view from the side of individual production stages for the production of a normally closed valve 200 according to the disclosure for microfluidic components of a polymeric layer system according to a first embodiment of the present disclosure.

This and the embodiment described below preferably have lateral dimensions of $10 \times 10$ mm² to $200 \times 200$ mm² for the normally closed valve.

Figure 1:
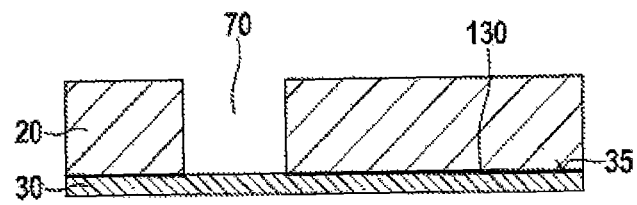
FIG. 1 shows a side sectional view of a production stage for the production of a normally closed valve according to the disclosure for microfluidic components of a polymeric layer system according to a first embodiment of the present disclosure.

FIG. 1 shows the step of connecting an upper polymer substrate 20 to a polymer membrane film 30 with the aid of a laser-based welding process. For this, a laser beam 130 is passed over a contact area 35 between the upper polymer substrate 20 and the polymer membrane film 30 and, depending on the application, the entire contact area 35 or only parts thereof is/are melted by the laser beam 130, so that a material-bonded connection is produced between the upper polymer substrate 20 and the polymer membrane film 30. The upper polymer substrate 20 has a recess 70, the function of which is described further below.

Figure 2:
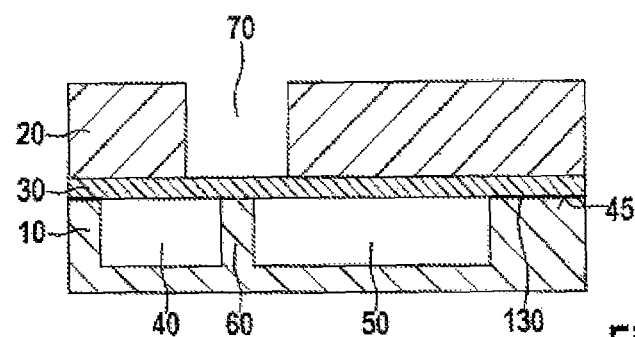
FIG. 2 shows a side sectional view of a production stage following the production stage of FIG. 1.

FIG. 2 shows the step of connecting a lower polymer substrate 10 to the polymer membrane film 30 with the aid of a laser-based welding process. For this purpose, the laser beam 130 is passed over a contact area 45 between the lower polymer substrate 10 and the polymer membrane film 30 and, depending on the application, the entire contact area 45 or only parts thereof is/are melted by the laser beam 130, so that a material-bonded connection is produced between the lower polymer substrate 10 and the polymer membrane film 30.

The lower polymer substrate 10 has a first chamber 40 and a second chamber 50, which are separated from one another by a fluidic barrier element 60 in the form of a web, the web serving as a valve seat.

Figure 3:
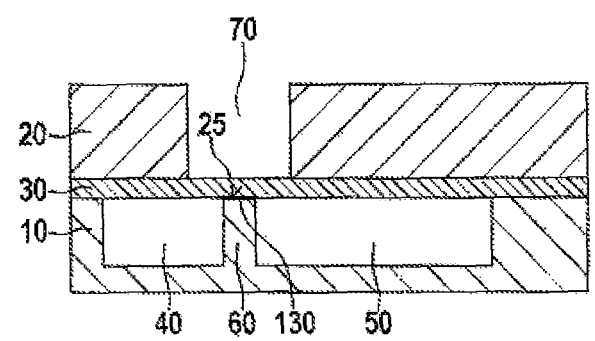
FIG. 3 shows a side sectional view of a production stage following the production stage of FIG. 2.

FIG. 3 shows the step of connecting the valve seat to the polymer membrane film 30 with the aid of a laser-based welding process, preferably by means of laser transmission welding. This involves the laser beam 130 being passed over a contact area 25 between the valve seat and the polymer membrane film 30 and, depending on the application, the entire contact area 25 or only parts thereof being melted by the laser beam 130, so that a material-bonded connection is produced between the valve seat and the polymer membrane film 30. Consequently, the valve is closed and necessary liquids (not represented) can be stored in a fluid-tight manner in a reservoir, such as for example the first chamber 40. However, the bonding strength between the valve seat and the polymer membrane film 30 may only be of such a level that it is possible to open the valve again by applying a sufficiently high pressure (for example 10-1000 kPa). This is achieved by an appropriate choice of the welding parameters in the laser-based production process. It is in this case also possible to speak of an 'unstable weld seam'.

Figure 4:
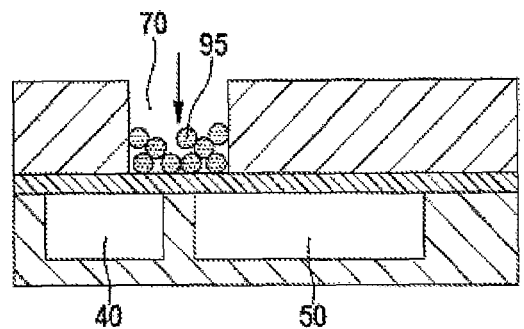
FIG. 4 shows a side sectional view of a production stage following the production stage of FIG. 3.

FIG. 4 shows the step of filling paraffin beads 95 onto the upper side of the polymer membrane film 30. Since the polymer membrane film 30 usually comprises thermoplastic elastomer films which are permeable to fluidic substances that are typically used (alcohols, solvents, aqueous solutions, salt solutions, buffer solutions, etc.), it is advisable for lengthy storage times (weeks, months, years) to increase its barrier properties. This is achieved by a composite of the polymer membrane film 30 with a barrier layer (for example a paraffin layer). For this purpose, during the production process the paraffin must be applied to the polymer membrane film 30 on the side facing away from the reservoir and heated.

For this purpose, paraffin beads 95 are filled into the recess 70 in the upper polymer substrate 20, to be precise in such an amount that the surface of the polymer membrane film 30 is covered by them.

Figure 5:
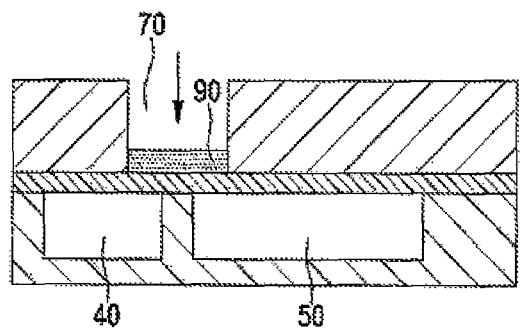
FIG. 5 shows a side sectional view of a production stage following the production stage of FIG. 4.

FIG. 5 shows the step of heating and cooling the paraffin beads on the polymer membrane film 30 to form a wax layer 90 on the polymer membrane film 30. For this purpose, the surrounding temperature is increased to a temperature above the melting temperature of the paraffin that is used, for example 50° C., whereby melting of the paraffin beads occurs. The melted paraffin can then be distributed uniformly on the polymer membrane film 30, which leads to a sealing of the polymer membrane film 30. Consequently, the barrier property of the polymer membrane film 30 is improved considerably, which is of advantage for the storage of liquids in the first chamber 40.

Figure 6:
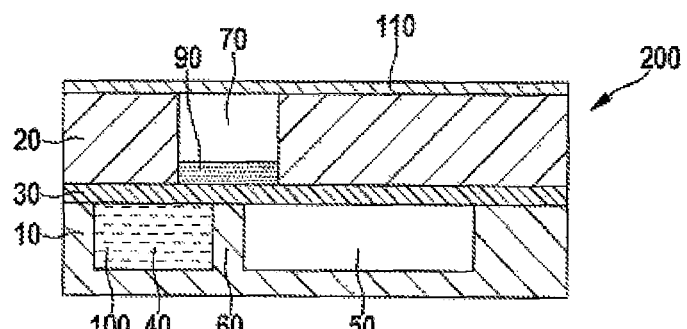
FIG. 6 shows a side sectional view of a production stage following the production stage of FIG. 5.

FIG. 6 shows the step of filling the first chamber 40 and closing the recess 70. Before the LOC is put into operation, the first chamber 40 of the normally closed valve 200 is filled with a substance 100, which is intended to be transferred into the second chamber 50 at a desired point in time, the second chamber 50 being part of a fluidic system. A sealing 110 is applied to the upper surface of the upper polymer substrate 20, whereby the recess 70 in the upper polymer substrate 20 forms a chamber.

FIGS. 7 to 11 respectively show a sectional view from the side of individual production stages for the production of a normally closed valve according to the disclosure for microfluidic components of a polymeric layer system according to a second embodiment of the present disclosure.

Not shown for this second embodiment is the first step of connecting the upper polymer substrate 20 to the polymer membrane film 30 with the aid of a laser-based welding process, which is identical to that according to FIG. 1 of the first embodiment, and the description of which has consequently been omitted.

Figure 7:
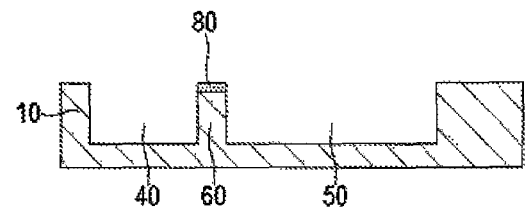
FIG. 7 shows a side sectional view of a production stage for the production of a normally closed valve according to the disclosure for microfluidic components of a polymeric layer system according to a second embodiment of the present disclosure.

FIG. 7 shows the step of applying paraffin to a valve seat in the lower polymer substrate 10. This involves applying paraffin to the free end of the valve seat or of the web 60 in the production process (for example by tampon printing, dispensing or the like), which after appropriate heating and cooling leads to a first wax layer 80 on the valve seat.

Figure 8:
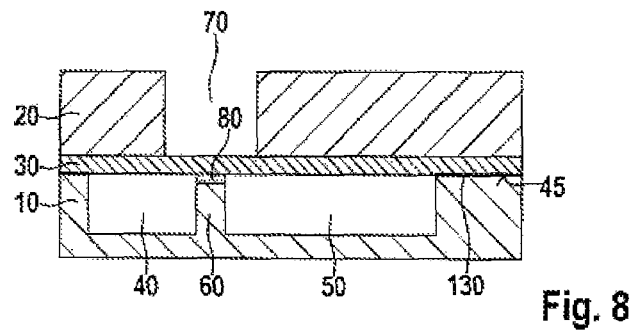
FIG. 8 shows a side sectional view of a production stage following the production stage of FIG. 7.

FIG. 8 shows the step of connecting a lower polymer substrate 10 to the polymer membrane film 30 with the aid of a laser-based welding process. For this purpose, the laser beam 130 is passed over a contact area 45 between the lower polymer substrate 10 and the polymer membrane film 30 and, depending on the application, the entire contact area 45 or only parts thereof is/are melted by the laser beam 130, so that a material-bonded connection is produced between the lower polymer substrate 10 and the polymer membrane film 30.

The lower polymer substrate 10 has a first chamber 40 and a second chamber 50.

Figure 9:
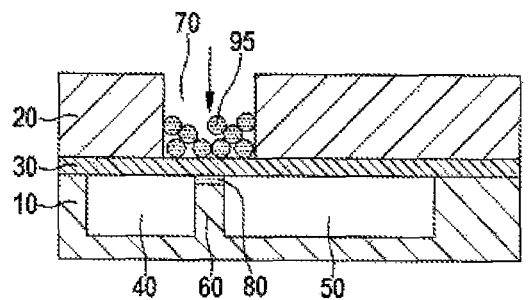
FIG. 9 shows a side sectional view of a production stage following the production stage of FIG. 8.

FIG. 9 shows the step of filling paraffin beads 95 onto the upper side of the polymer membrane film 30. For this purpose, paraffin beads 95 are filled into the recess 70 in the upper polymer substrate 20, to be precise in such an amount that the surface of the polymer membrane film 30 is covered by them.

Figure 10:
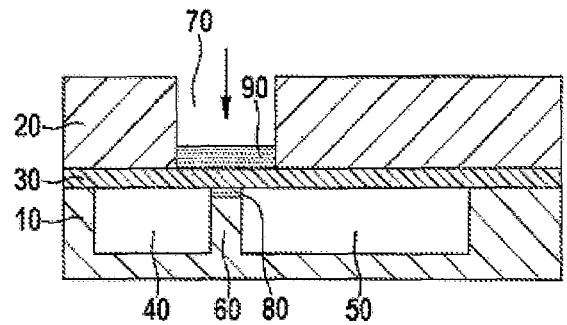
FIG. 10 shows a side sectional view of a production stage following the production stage of FIG. 9.

FIG. 10 shows the step of heating and cooling the paraffin beads on the polymer membrane film 30 to form a second wax layer 90 on the upper side of the polymer membrane film 30. This step is substantially identical to the corresponding step of the first embodiment according to FIG. 5, for which reason reference is made at this point to the relevant statements made.

In addition to this, for the initial configuration it is in any case necessary in this process step to ensure a contact between the valve seat and the polymer membrane film 30, for example by way of renewed heating of the wax layer 80, this layer melting completely or partially, in order in this way to form a material-bonded connection to the polymer membrane film 30 after the cooling of the wax layer 80.

Figure 11:
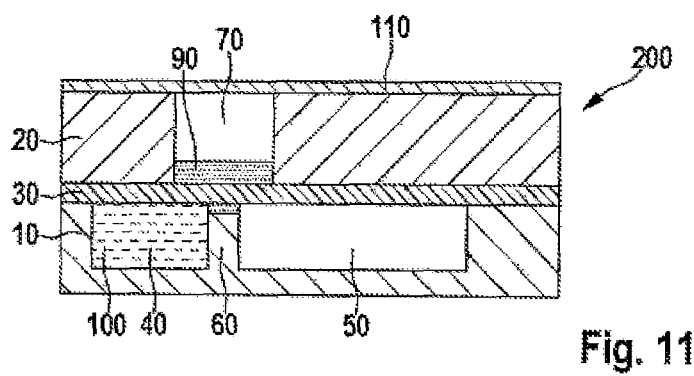
FIG. 11 shows a side sectional view of a production stage following the production stage of FIG. 10.

FIG. 11 shows in turn the step of filling the first chamber 40 and closing the recess 70. Before the LOC is put into operation, the first chamber 40 of the normally closed valve 200 is filled with a substance 100, which is intended to be transferred into the second chamber 50 at a desired point in time, the second chamber 50 being part of a fluidic system. A sealing 110 is applied to the upper surface of the upper polymer substrate 20, whereby the recess 70 in the upper polymer substrate 20 forms a chamber.

For opening this 'thermally unstable bond', a predetermined temperature threshold value, which is close to or higher than the softening or melting point of the material of the first wax layer 80 (here paraffin, typically 20-100° C.), must be exceeded when there is a corresponding pressure difference (for example 10-1000 kPa) between the two chambers 40 and 70, under which the paraffin partially or completely liquefies and the normally closed valve 200 consequently opens.

Figure 12:
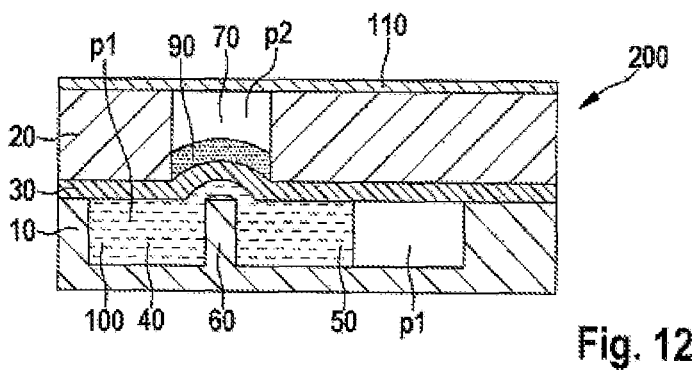
FIG. 12 shows a sectional view from the side to illustrate a first way of functioning for a release of reagents in a normally closed valve according to the disclosure for microfluidic components of a polymeric layer system.

FIG. 12 shows a sectional view from the side to illustrate a first way of functioning for a release of reagents in a normally closed valve 200 according to the disclosure for microfluidic components of a polymeric layer system.

The normally closed valve 200 for microfluidic components of a polymeric layer system has in turn a lower polymer substrate 10, an upper polymer substrate 20 and also a polymer membrane film 30, which is arranged lying between the lower polymer substrate 10 and the upper polymer substrate 20. The lower polymer substrate 10 has a first chamber 40, a second chamber 50 and a fluidic barrier element 60 in the form of a web, the fluidic barrier element 60 separating the first chamber 40 from the second chamber 50. The first chamber 40 is fluidically coupled to the second chamber 50 by way of the polymer membrane film 30, and in an initial configuration a material-bonded connection of the polymer membrane film 30 to the fluidic bather element 60 prevents a fluidic communication of the first chamber 40 to the second chamber 50. A sealing 110 has been applied above the second polymer substrate 20.

The upper polymer substrate 20 has in the region of the fluidic barrier element 60 a recess 70, into which the polymer membrane film 30 extends during operation. The polymer membrane film 30 is coated on the side of the recess 70 with a wax layer 90 of a predetermined thickness.

The material-bonded connection of the polymer membrane film 30 to the fluidic barrier element 60 is realized here by way of the 'unstable weld seam'.

The opening mechanism of the normally closed valve 200 is effected by increasing a pressure threshold value between the first chamber 40 and the recess 70. In principle, the release of the reagent or the substance 100 from the first chamber 40 into the second chamber 50 can be realized by pressure or negative pressure. In this case, the recess 70 has in the initial configuration a pressure p2, whereas in the first chamber 40 there is a pressure p1, which substantially corresponds to the pressure p2. If the substance 100 is then to be released, the pressure p1 is increased, to be precise to a predetermined value, at which the material-bonded connection of the polymer membrane film 30 to the fluidic barrier element 60 is ended. Under the effect of the rising pressure p1, the polymer membrane film 30 together with the wax layer 90 deforms in the direction of the recess 70. In this way, the substance 100 can flow from the first chamber 40 into the second chamber 50 by way of the web, whereby the substance 100 is available in the LOC (not represented) for the intended process steps.

Figure 13:
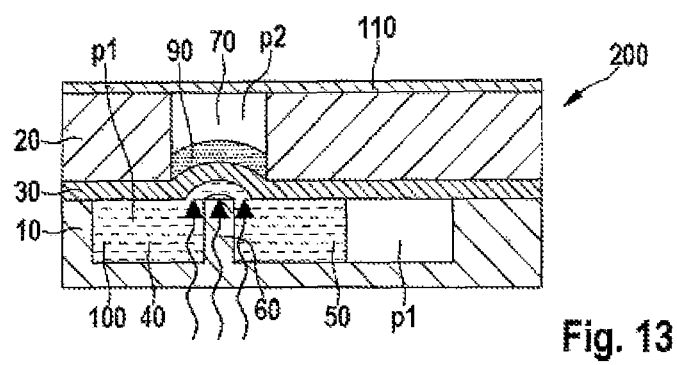
FIG. 13 shows a sectional view from the side to illustrate a second way of functioning for a release of reagents in a normally closed valve according to the disclosure for microfluidic components of a polymeric layer system.

FIG. 13 shows a sectional view from the side to illustrate a second way of functioning for a release of reagents in a normally closed valve 200 according to the disclosure for microfluidic components of a polymeric layer system.

The structure of the normally closed valve 200 is substantially identical to the configuration described above according to the first way of functioning for the release of reagents, but with the difference that in the case of the second way of functioning the material-bonded connection of the polymer membrane film 30 to the fluidic barrier element 60 is realized by way of the 'thermally unstable bond'.

The opening mechanism of the normally closed valve 200 is effected by increasing the temperature threshold value in combination with the use of pressure. Consequently, here the release of the reagent or the substance 100 from the first chamber 40 into the second chamber 50 is realized by way of changing the temperature in the region of the interface of the polymer membrane film 30 with respect to the fluidic barrier element 60.

The release of the substance 100 from the initial configuration takes place by the introduction of heat (represented here by arrows) into the material-bonded connection of the polymer membrane film 30 to the fluidic barrier element 60, whereby a first wax layer (not represented) between the polymer membrane film 30 and the fluidic barrier element 60 is heated to a predetermined temperature, at which the wax (begins to) melt(s) and in this way the material-bonded connection is ended.

After the disconnection of the material-bonded connection, the transfer of the substance 100 into the second chamber 50 takes place, likewise with the aid of pressure (see in this respect the corresponding statements made in relation to FIG. 12). Under the effect of the rising pressure p1, the polymer membrane film 30 together with the wax layer 90 deforms in the direction of the recess 70. In this way, the substance 100 can flow from the first chamber 40 into the second chamber 50 by way of the web, whereby the substance 100 is available in the LOC for the intended process steps.

Depending on the application, valves with different ways of functioning may be provided on the LOC.

What is claimed is:

1. A normally closed valve for microfluidic components, comprising:
   a polymer substrate defining a first chamber and a second chamber and including a fluidic barrier element separating the first chamber from the second chamber; and
   a polymer membrane film arranged on the polymer substrate and configured to control a fluid coupling between the first chamber and the second chamber,
   wherein, in an initial configuration, a connection of the polymer membrane film to the fluidic barrier element closes the fluid coupling between the first chamber and the second chamber, the connection being formed by a first wax layer that is materially bonded to the polymer membrane film and the fluidic barrier element, and
   wherein the first chamber is at least partially filled with a substance in the initial configuration and configured such that applying a pressure to the substance greater than a breaking pressure threshold disconnects the first wax layer from one of the polymer membrane film and the fluidic barrier element so as to open the fluid coupling between the first chamber and the second chamber to transfer the substance from the first chamber into the second chamber.

2. The normally closed valve according to claim 1, wherein the connection of the first wax layer to the polymer membrane film and the fluidic barrier element is a material-bonded connection produced by one of soldering, welding, and adhesive bonding.

3. The normally closed valve according to claim 2, wherein the material-bonded connection of the polymer membrane film to the fluidic barrier element is formed with a welded connection of the first wax layer to the polymer membrane film and the fluidic barrier element, the first wax layer having breaking resistance that is overcome at the breaking pressure threshold.

4. The normally closed valve according to claim 1, wherein in the initial configuration the polymer membrane film includes a first side connected to the fluidic barrier via the first wax layer and a second opposite side, and the polymer membrane film is coated on the second side directly opposite from the fluidic barrier element with a second wax layer of a predetermined thickness.

5. The normally closed valve according to claim 4, wherein at least one of the first wax layer and the second wax layer is formed from paraffin.

6. The normally closed valve according to claim 1, wherein the fluidic barrier element is formed as a web and forms a valve seat of the normally closed valve.

7. The normally closed valve according to claim 1, wherein the connection of the polymer membrane film to the fluidic barrier element is configured such that heat applied to an interface between the polymer membrane film and the fluidic barrier element reduces the breaking pressure threshold at which the connection of the polymer membrane film to the fluidic barrier element disconnects.

8. The normally closed valve according to claim 1, wherein the valve is configured to close again after an actuation.

9. The normally closed valve according to claim 1, wherein the polymer membrane film is formed from one of an elastomer, a thermoplastic elastomer, thermoplastics, a heat-sealing film, and composite TPE films with high battier properties.

10. The normally closed valve according to claim 1, wherein a thickness of the polymer membrane film is between 5 μm and 300 μm.

11. The normally closed valve according to claim 1, wherein the breaking pressure threshold greater than or equal to 10 kPa and less than or equal to 1000 kPa.

12. A method for operating a normally closed valve, comprising:
  preventing, in an initial configuration, a fluidic communication of a first chamber of a polymer substrate with a second chamber of a polymer substrate via a connection of a polymer membrane film arranged on the polymer substrate to a fluidic barrier element of the substrate, which separate the first chamber from the second chamber, the connection being formed by a wax layer that is materially bonded to the polymer membrane film and the fluidic barrier element; and
  applying a pressure greater than a breaking pressure threshold to a substance in the first chamber so as to disconnect the wax layer from one of the polymer membrane film and the fluidic barrier element to enable the fluid communication with the second chamber to transfer the substance from the first chamber into the second chamber.

13. The method according to claim 12, wherein the breaking pressure threshold is greater than or equal to 10 kPa and less than or equal to 1000 kPa.

14. A normally closed valve for microfluidic components, comprising:
  a polymer substrate defining a first chamber and a second chamber and including a fluidic barrier element separating the first chamber from the second chamber; and
  a polymer membrane film arranged on the polymer substrate and configured to control a fluid coupling between the first chamber and the second chamber,
  wherein, in an initial configuration, a connection of the polymer membrane film to the fluidic barrier element closes the fluid coupling between the first chamber and the second chamber,
  wherein the first chamber is at least partially filled with a substance in the initial configuration and configured such that applying a pressure to the substance greater than a breaking pressure threshold disconnects the connection of the polymer membrane film to the fluidic barrier element and opens the fluid coupling between the first chamber and the second chamber to transfer the substance from the first chamber into the second chamber, and
  wherein, in the initial configuration, the polymer membrane film includes a first side connected to the fluidic barrier element via the connection and a second side opposite the first side, and the polymer membrane film is coated with a wax layer on the second side directly opposite from the connection with the fluidic barrier element; wherein the material-bonded connection of the polymer membrane film to the fluidic barrier element is formed with a second wax layer between the polymer membrane film and the fluidic barrier element.

15. The normally closed valve according to claim 14, wherein a surface of the second side of the polymer membrane film is coated with the wax layer directly opposite from the connection with the fluidic barrier element.

* * * * *